United States Patent

Esquival

[15] 3,648,660
[45] Mar. 14, 1972

[54] AUTOMATIC ANIMAL FEEDER

[72] Inventor: Raymond D. Esquival, 1740 LaSenda Place, Los Angeles, Calif. 91030

[22] Filed: Mar. 25, 1970

[21] Appl. No.: 22,524

[52] U.S. Cl. ........................................119/51.11, 119/51.5
[51] Int. Cl. .................................................A01k 05/00
[58] Field of Search.....................119/51.11, 51.5, 51, 52, 74

[56] References Cited

UNITED STATES PATENTS 3,196,835   7/1965   Bergevin..............................119/51.11
2,706,966   4/1955   Cline .......................................119/74

*Primary Examiner*—Hugh R. Chamblee
*Attorney*—Roger A. Marrs

[57] ABSTRACT

An automatic dry food pet feeder is disclosed herein having a rotatable dry food storing and dispensing means for introducing dry food to a wetting station and then to a collection station at a feeding tray available for consumption by animals. Means are provided for supplying water from a reservoir to the wetting station via an apertured water jacket and for dispensing water to a water bowl via a spigot. The distribution of water to the wetting station and into the bowl is synchronously timed with the dispensing means and is under the control of an electrical timer for overall control and under fine-time control by means of a settable microswitch operated cam settable by the drive means for the dispensing means.

7 Claims, 3 Drawing Figures

Patented March 14, 1972
3,648,660
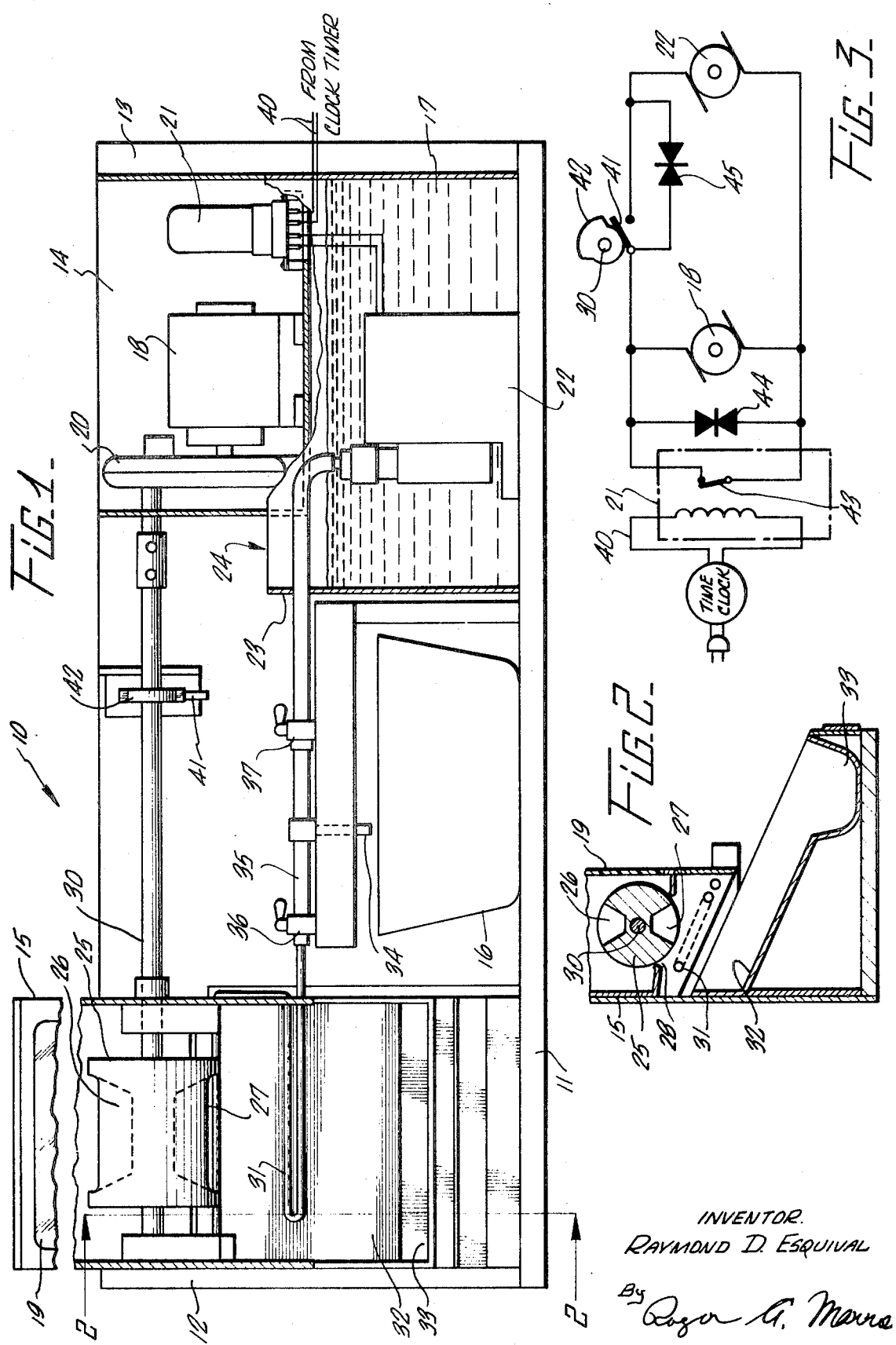

AUTOMATIC ANIMAL FEEDER

BACKGROUND OF THE INVENTION

1. Field of the Invention

This invention relates to automatic animal feeders and, more particularly, to a novel automatic pet feeder capable of being programmed for operation involving the mixing of dry food with water, providing a supply of drinking water and providing means for timing and interrelating the dry food wetting procedure so that animals of different sizes and capacities may be readily accommodated while unattended.

2. Description of the Prior Art

In the past, automatic animal feeders have been provided which disclose a timer-controlled feeding device for mixing predetermined quantities of solid food with water. In some of the prior art devices, the predetermined quantity of solid animal food is initially dispensed in a tray which is subsequently sprayed with water. Also, it has been known to use a timer-controlled animal feeder where predetermined quantities of solid food and water are mixed. These latter techniques and devices have been employed in feeding livestock, for example, where a timer-controlled apparatus is employed for mixing dry food and water. Typical of devices and apparatus of the prior art encompassing these concepts are shown and described in U.S. Pat. Nos. 3,196,835; 3,450,101; and 3,037,481.

Although these prior attempts have been successful in ultimately delivering food to an animal, there is still a need to provide a device or apparatus for supplying a quantity of drinking water in addition to dispensing a predetermined quantity of moistened food. Also, it is highly desirable to employ a particular timing circuit wherein overall control of the apparatus may be by a first electrical timing means and then, additional timing means may be employed for adjusting the water and moistened food mixture depending on the size and capacity of the feeding animal. Furthermore, different time intervals in seconds, so as to provide a varying amount of food for different sized pets or animals, is also desired. Preferably, the water supply and means for introducing the water to the dry food area, as well as to a drinking bowl, should be in a self-contained structure which permits ready access not only to the component parts of the apparatus but to the food container and water bowl and storage areas.

SUMMARY OF THE INVENTION

Accordingly, the difficulties and problems encountered with conventional automatic pet feeding devices are obviated by the present invention which provides an apparatus having a feeding station, a drinking station, and a reservoir for holding a supply of water. A dry food dispensing means is provided at the dispensing station which includes a container for holding a predetermined quantity of dry pet food and further includes a rotatable cylinder having slots therein for collecting a selected amount of the dry food and for discharging the selected amount to a wetting station surrounded by an apertured water jacket whereby the food passing therethrough becomes moist. Located beneath the apertured water jacket, there is provided a tray for receiving the moistened food and the tray incorporates a receiving surface which is at a 25°–30° angle so as to move the wet food forward under the control of gravity to a consuming area occupied by the animal.

In addition to the moistening of the dry food at the dispensing station, there is provided a water bowl for receiving a selected amount of water so that the animal will be provided not only with moistened food but with a drinking supply. The water from the reservoir supplied to the dispensing means and to the drinking bowl is under the control of a microswitch timer which in turn is operated by a movable cam. However, overall electrical control is provided by a clock timer which, when ON, permits operation of the microswitch for operating a central power means to provide power for the dispensing cylinder and the pump for furnishing water from the reservoir to the water bowl and the wetting station.

Therefore, it is among the primary objects of the present invention to provide a novel automatic pet feeding apparatus which incorporates a thermal time delay relay device so that different time intervals in terms of seconds may be provided for varying the amount of food dispensed to different sizes and capacities of pets or animals.

Another object of the present invention is to provide an automatic dry food pet feeding apparatus wherein the amount of water mixed with the dry food can be adjusted by changing a timing cam provided with a different time angle.

Still another object of the present invention is to provide a novel automatic animal feeder comprising three major units incorporating a food dispensing container, a water pump and tank, and an electrical motor for operating the dispensing mechanism as well as the supply of water for mixing therewith.

Another object of the present invention is to provide a novel automatic dry food pet feeder which may be regulated to dispense moist food and a supply of drinking water at predetermined timed intervals which may be readily programmed by the use of a time-controlled cam and microswitch combination in addition to a timing clock and thermal time delay relay.

Still another object of the present invention is to provide a novel automatic dry food pet feeding apparatus which is self-contained and may be automatically operated while unattended for several days at a time.

Still a further object of the present invention is to provide a novel animal pet feeder which is compartmentalized in convenient sections so as to provide a logical sequence of feeding for a pet or animal and which may be readily cleaned or serviced without major disassembly thereof.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG 1 is a longitudinal cross-sectional view of the novel automatic dry food pet feeder of the present invention showing the food dispensing station at the left-hand side thereof, a drinking station at the center thereof and the control and water reservoir station at the right-hand side thereof;

FIG. 2 is a fragmentary transverse cross-sectional view of the pet feeding apparatus shown in FIG. 1 as taken in the direction of arrows 2—2 thereof; and FIG. 3 is a schematic drawing of an electrical circuit incorporating the electrical components such as timers, motors and relays employed in the apparatus shown in FIG. 1.

DESCRIPTION OF THE PREFERRED EMBODIMENTS

The automatic dry food pet feeder of the present invention is indicated in the general direction of arrow 10 and includes an elongated base of platform 11 and end walls 12 and 13. A back wall 14 may be employed to support some of the component parts and the base 11 may support other parts. In general, the apparatus includes a dispensing station located in the general area of a dry food container 15, a drinking water station as represented by the presence of a removable bowl 16 supported on the base 11, and a control and water reservoir station indicated by the water reservoir 17, drive motor 18, gear reduction train 20 and controller relay 21. Also included in this latter station is submerged water pump 22, including its motor as well as a sidewall 23 which serves to define the open tank with cover for containing the water 17 in cooperation with the base 11 and end wall 13. Obviously, back wall 14 and a wall parallel thereto completes the tank for holding the water of the reservoir 17. It is to be particularly noted that the pump and motor combination 22 is completely submerged and surrounded by the water supply 17 and that an opening to the reservoir is indicated in the direction of arrow 24 through which additional supplies of water may be introduced to the tank.

Located on the other end of the apparatus, is the food container 15 for storing a predetermined supply or quantity of dehydrated pet food. Located within the storing cavity or area of the container, there is provided a rotatable dispensing means comprising a cylinder 25 having pockets or receptacles 26 and 27 located about its periphery. The periphery of the cylinder is disposed to rotate through an opening indicated by numeral 28 in FIG. 2 so that the dry food within the storage cavity of the container will be gravity fed through the opening 28 under the control of the dispensing cylinder 25. The receptacles 26 and 27 may be of sufficient area to select a quantity of the dry food for dispensation through the opening 28 as the cylinder rotates on its shaft 30.

It is to be understood that the dispensing means may take the form of a hollow cylinder having a pair of elongated slots disposed 180° apart so that the food product collected within the cylinder may be readily dispensed through the slots and then through the opening 28 as the cylinder rotates. Also, a window 19 may be mounted in the wall of the container so that the food level stored therein may be readily determined.

Immediately below the container 15 and disposed beneath the opening 28, there is provided a wetting station which includes an apertured water jacket 31 having a plurality of spray jets directed toward the interior thereof so as to thoroughly moisten and wet the material as it falls past or through the multiple coils of the water jacket. Located immediately below the wetting station is a collection station or area taking the form of a tray 32 having a collection surface disposed at an angle of approximately 25° or 30° so as to insure that the moistened food will be moved in a forward direction towards an eating station indicated by numeral 33. This portion of the platform or tray is exposed exteriorly of the apparatus so that the moistened food will be available for consumption by the animal.

Located adjacent to the container 15 and in the center of the apparatus is the water bowl 16. The water bowl is disposed immediately beneath a dispensing spigot or nozzle 34 which is coupled into a main water line or conduit 35. The dispensing nozzle 34 is in parallel connection with the water jacket 31. A control valve 36 may be employed to control the amount of water supplied to the water jacket while a second control valve 37 may be provided for regulating the amount of water supplied to both the water jackets and/or to the dispensing nozzle 34.

The control and drive portion of the apparatus 10 includes a motor unit 18 which is drivingly coupled to the shaft 30 via the gear reduction train enclosed within housing 20. The motor 18 may only be turned on when the circuit from a time clock is closed. A suitable time clock, such as a standard clock timer or radio clock may be connected to lines 40 which in turn are connected to the thermal delay relay 21 and then to the power circuit for the operation of motor 18. Also, the relay 21 is included in the circuit with the pump motor 22. The water pump is wired in series with a microswitch 41 which is controlled by the action of a cam 42 having a sloping surface for determining time intervals when the drive shaft 30 is rotating. The water pump operates on 115 volts alternating current in the same fashion as the motor and thermal delay relay.

As shown in FIG. 3, a schematic drawing of the electrical circuit including its component parts is illustrated for automatically supplying water to the water jacket 31 and bowl 16 as well as for automatically introducing dry food to the wetting station. Normally, the contacts 43 of the delayed relay 21 are closed while the contact 41 associated with the microswitch for energizing the pump 22 is open. Furthermore, the switch in the time clock is open and the system is at rest.

The operation of the automatic dry food pet feeder is controlled by three timing elements. Basically, the external time clock is electrically operated on 115 volts, 60 cycles household current in conjunction with the two other timing elements comprising the thermal delay relay 21 and the timing cam 42 when the external time clock or clock radio is preset to a prescribed time. When this time has been reached, the circuit within the timer or time clock is closed to energize the time delay relay 21. This, in turn, drives the shaded pole induction motor 18 which has been geared down to operate at 20 revolutions per minute, for example. This action drives shaft 30 to rotate the food dispensing cylinder and to rotate timing cam 42 which closes switch 41 in order to energize motor 22 and supply water to water jacket 31 and bowl 16 via conduit 35. When the thermal delay relay 21 opens after a set period, energy to motor 18 and hence, to pump motor 22 is interrupted and further supply of water and dry food ceases. The switch in the time clock, of course, has moved to a new setting and the relays and contacts are reset for the next cycle of operation.

When the automatic dry food pet feeder is plugged into the clock timer, the timer will actuate the system at a particular time selected to feed the pet or animal. When the clock is energized, the unit goes into operation. The dry food is stored in the container before the pet owner leaves for the day or weekend. The pet feeder may now dispense food to the pet anytime from one to any number of days depending on the quantity of the food in the container and water in the tank. Sufficient water is placed into the water container so it may be mixed with the food at the wetting station when the water is sprayed from the water jacket. The timing cam 42 is actuated simultaneously by the electric motor through the rotation of shaft 30 to mix the water with the dry food. The thermal time delay relay 21 opens the circuit of the motor and the water pump to shut off both units when there is sufficient food and water on the tray as determined by the length of the settable delay in the relay. As the external clock timer moves on, the unit is again reset by itself since the thermal relay is closed and the clock is open-circuited for the next feeding cycle. The versatility of the apparatus is evident in that by changing the thermal time delay relay to different time intervals as measured in seconds, it provides a varying amount of food compatible to the size and capacity of the animal. Also, the amount of water can be changed by the selection of a cam 42 having a different time angle. This may be achieved by the manufacturer, pet distributor or the owner himself.

The dispensing cylinder is pinned or secured to the motor shaft 30 via the gear reduction train so that there is no slippage during operation. The cylinder is designed so that when rotating, there are multiple slots or indentations formed in the periphery of the cylinder so that sufficient food may be picked up from the surrounding storage area and dispensed to the wetting station. As the cylinder rotates, it collects dry food composed of a wide variety of brands and dispenses the food past the water jacket so that the dry food can be moistened by the spray therefrom. The food is then deposited in a food tray beneath the water jacket. The food tray is mounted at an angle of approximately 25°-30° and is tilted forward so that the food will flow in a gravity fed forward direction within reach of the animal. The end result is that the dry food is mixed with the proper amount of water as it passes the water jacket and is further supplied with water as it soaks up more water when deposited on the food tray. A special cam 42 is positioned to operate the microswitch which is wired in series with the thermal delay contacts and the water pump motor circuits. A rotation of six or seven times is normally required to give the right amount of water for an average medium sized dog or pet. The number of feedings per day will depend on the number of trippers in the external time-clock, depending on how many times the owner of the animal wants to feed his pet. The usefulness of this apparatus will apply to animal hospitals, veterinarians, boarding kennels, and the individual pet owners.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. An automatic animal feeder for mixing dry food with water and for dispensing the moist food within reach of the animal, comprising:
    a container for storing a quantity of dry food;
    a tank for holding a quantity of water;
    a tray located beneath said container;
    dispensing means for separating a selected amount of food from said container and gravity feeding the food from said container to said tray;
    means operably coupled to said tank and disposed between said container and said tray for supplying water to moisten the dry food;
    drive means including a control means operably coupled between said water supply means and said dispensing means for simultaneously operating said dispensing means and said water supply means;
    said water supply means including an apertured water jacket and a conduit interconnecting said water jacket with said tank in fluid communication with said quantity of water;
    said drive means including a motor pump submerged in said quantity of water and connected to said conduit for providing a pressurized supply of water thereto;
    a motor operably connected to said dispensing means via a drive shaft for providing continuous movement thereto; and
    said control means including a switch means operably connected between said shaft and said pump motor to control the energization time period of said pump motor.

2. The invention as defined in claim 1, wherein said control means further includes an electric timer operably connected to said shaft drive motor for determining the initiation of the dispensing means and said water supply means operation.

3. The invention as defined in claim 2 wherein said control means further includes a thermal time delay relay coupled between said timer and said pump motor for determining the cessation of said shaft drive motor operation.

4. The invention as defined in claim 3 wherein
    said control means further includes a time setting means included in said switch means which takes the form of a cam carried on said shaft so as to rotate therewith and which is formed with a sloping angular surface engageable with a trip member of a microswitch that is coupled to said pump motor.

5. An automatic animal feeder for mixing dry food with water and for dispensing the moist food within reach of the animal, comprising:
    a container for storing a quantity of dry food;
    a tank for holding a quantity of water; a tray located beneath said container;
    dispensing means for separating a selected amount of food from said container and gravity feeding the food from said container to said tray;
    means operably coupled to said tank and disposed between said container and said tray for supplying water to moisten the dry food;
    drive means including a control means operably coupled between said water supply means and said dispensing means for simultaneously operating said dispensing means and said water supply means;
    said control means including a timer connected to said drive means for initiating the operation of said dispensing means; and
    timing means operative in response to said dispensing means for determining the time period for supplying water to the dry food.

6. The invention as defined in claim 5 including a thermal time delay relay coupled between said timer and said drive means for turning off said drive means.

7. The invention as defined in claim 6 wherein
    said tray is angularly disposed at about 25°–30° from the horizontal so that the moistened food will move forward under the force of gravity.

* * * * *